(12) United States Patent
Rosenfeldt

(10) Patent No.: US 6,598,756 B1
(45) Date of Patent: Jul. 29, 2003

(54) KNOCK DOWN STILLAGE BOX

(75) Inventor: Niels Rosenfeldt, Mpumalanga (ZA)

(73) Assignee: Clip-Lok International Limited, Tortola (VG)

( * ) Notice: Subject to any disclaimer, the term of this patent is extended or adjusted under 35 U.S.C. 154(b) by 216 days.

(21) Appl. No.: 09/656,936

(22) Filed: Sep. 7, 2000

(30) Foreign Application Priority Data

| Nov. 3, 1999 | (ZA) | 99/6906 |
| Apr. 4, 2000 | (ZA) | 2000/1682 |

(51) Int. Cl.⁷ ................................................. B65D 8/14
(52) U.S. Cl. ...................... 220/4.28; 206/600; 217/15; 217/47; 220/6; 220/7
(58) Field of Search ............................... 220/4.28, 4.33, 220/6, 7; 217/16, 8, 12 R, 15, 43 R, 47, 43 A; 206/511, 600

(56) References Cited

U.S. PATENT DOCUMENTS

| 1,119,071 A | * | 12/1914 | Dieckmann | 217/15 |
| 1,349,799 A | * | 8/1920 | Albrecht | 220/7 |
| 1,524,966 A | * | 2/1925 | Boelman et al. | 217/15 |
| 3,311,254 A | * | 3/1967 | Beh | 220/6 |
| 3,323,674 A | * | 6/1967 | Nist, Jr. | 217/12 R |
| 3,481,502 A | * | 12/1969 | Slayman | 217/42 |
| 3,570,697 A | * | 3/1971 | Langston | 217/42 |
| 3,872,542 A | | 3/1975 | Bitney | |
| 5,617,967 A | * | 4/1997 | Neidhart | 220/4.33 |
| 5,865,334 A | * | 2/1999 | Ruiz et al. | 220/6 |

FOREIGN PATENT DOCUMENTS

| DE | 42 04 902 A1 | 8/1992 |
| DE | 199 08 824 A1 | 9/2000 |
| WO | WO95/13969 A1 | 5/1995 |

* cited by examiner

Primary Examiner—Lee Young
Assistant Examiner—Joseph C. Merek
(74) Attorney, Agent, or Firm—Alston & Bird LLP

(57) ABSTRACT

A reusable knock down stillage box comprises a base pallet assembly including a rectangular base panel and four side walls extending from the base panel, and a top panel, Each of the side walls comprise lower and upper side wail panels, with three of the lower side wall panels being hinged to three of the upper side wall panels, and the lower side wall panels in turn being connected to the base panel by means of L-shaped clips. The upper or side wall panels are movable between an erected cargo stowing position In which stillage components are erected for stowing cargo such as motor vehicle panels within the box and a collapsed stillage stowing position. In the collapsed position, the top panel and the upper side wall panels, in combination with the base panel and the lower side wall panels, provide a sub-box defining a closed sub-volume within which the stillage components are stowable in the collapsed condition. The stillage components and the clips associated with a particular box are thus conveniently housed within the sub-volume of that box when the knocked down boxes are shipped back to their cargo loading destination.

15 Claims, 9 Drawing Sheets

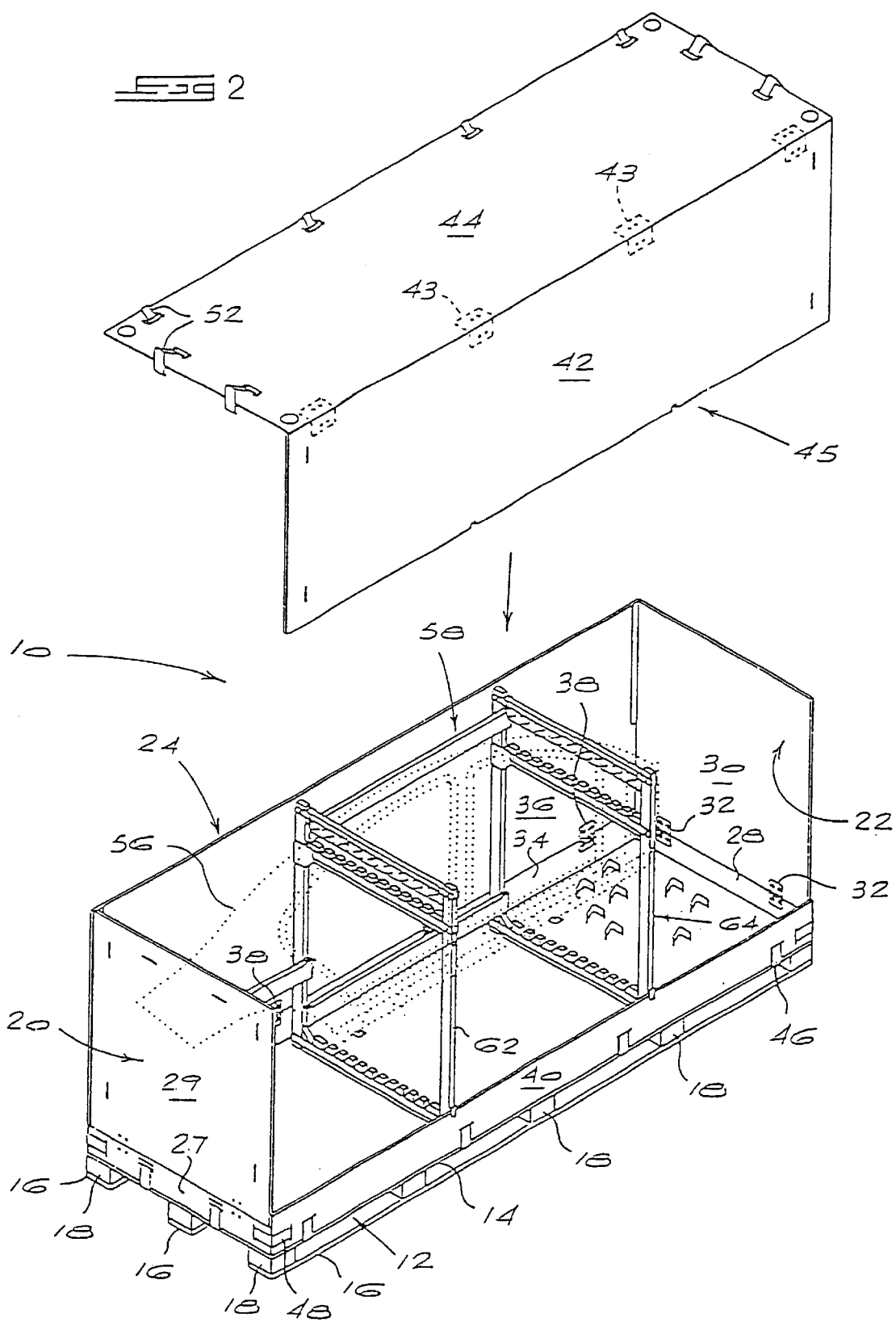

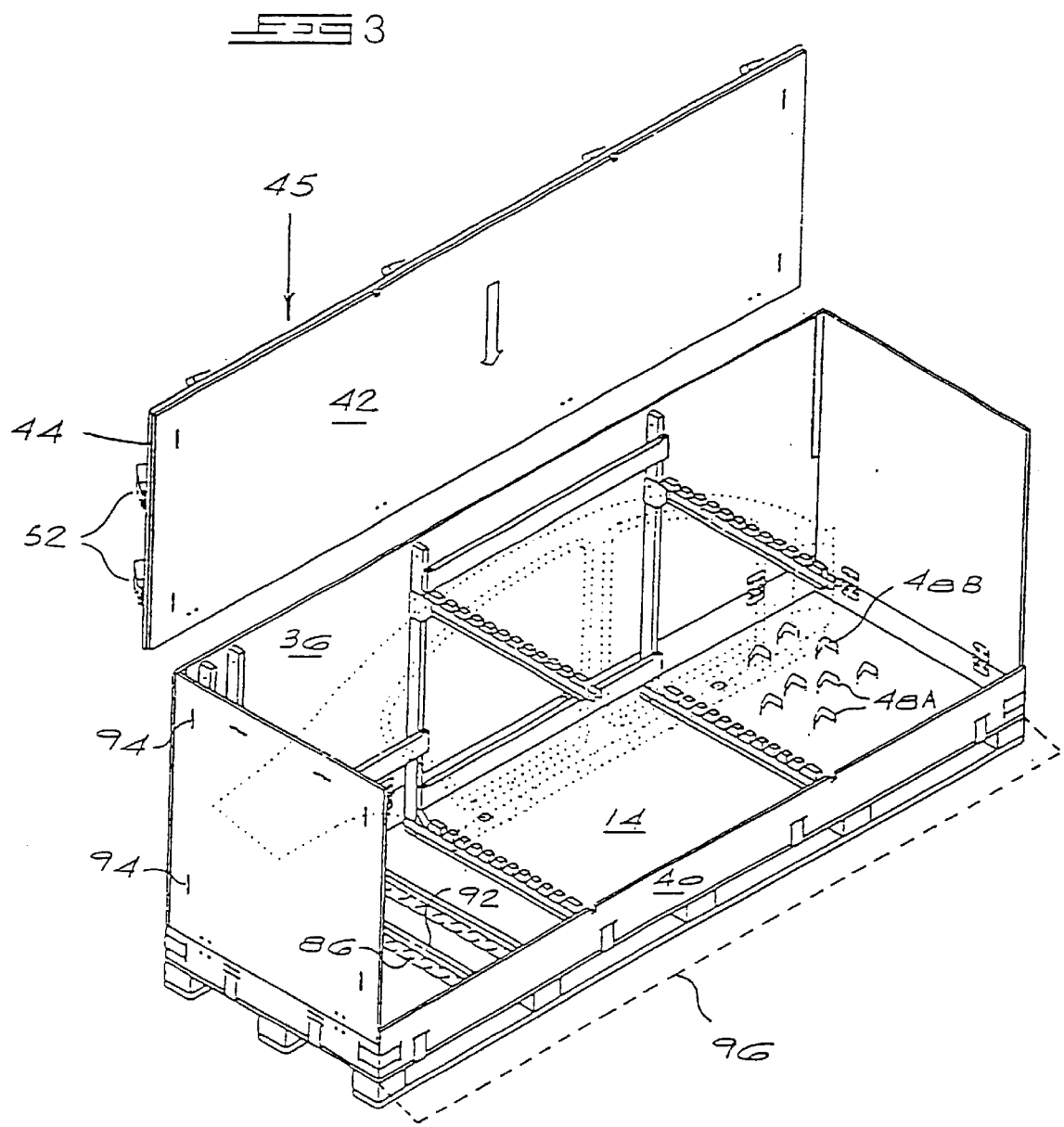

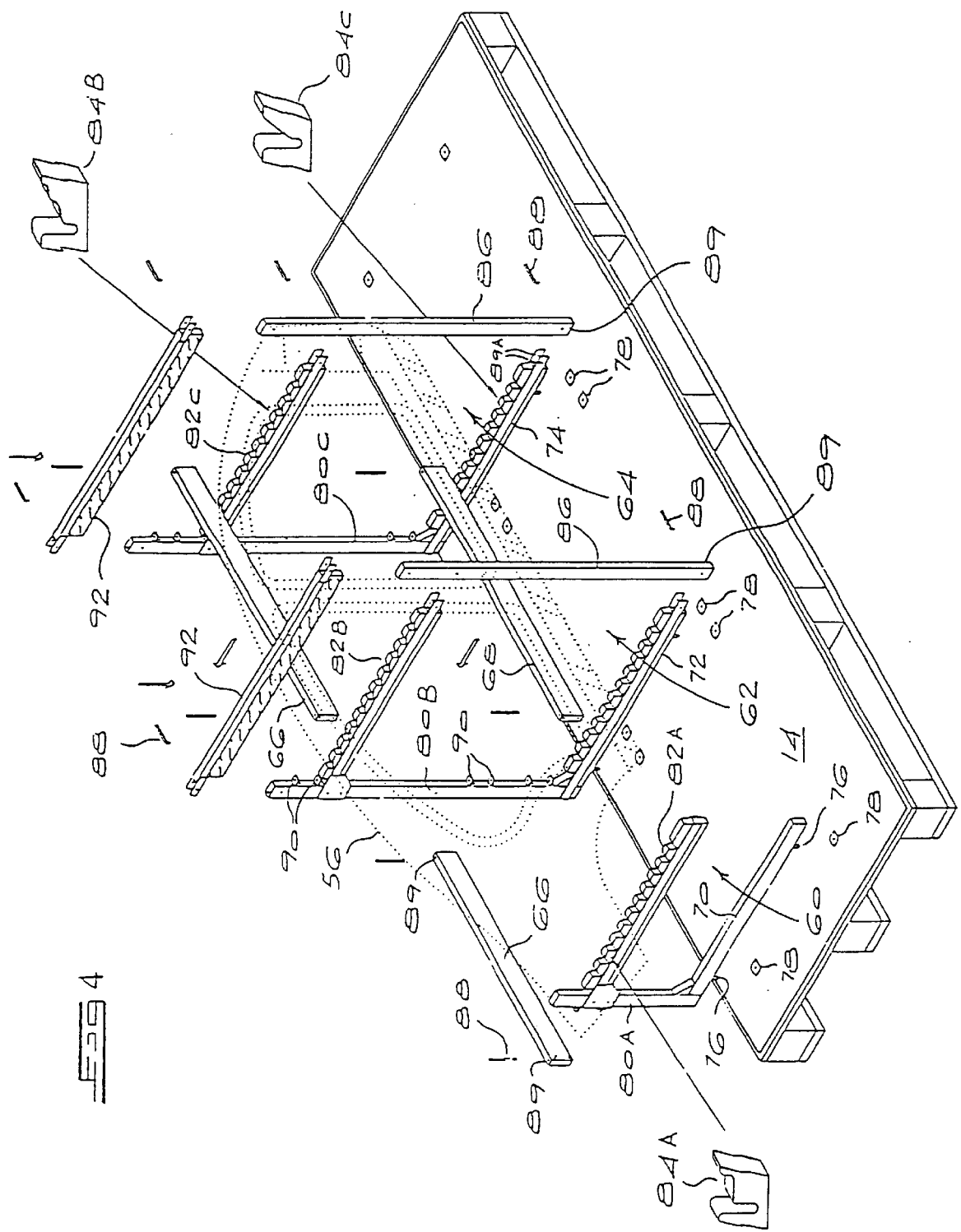

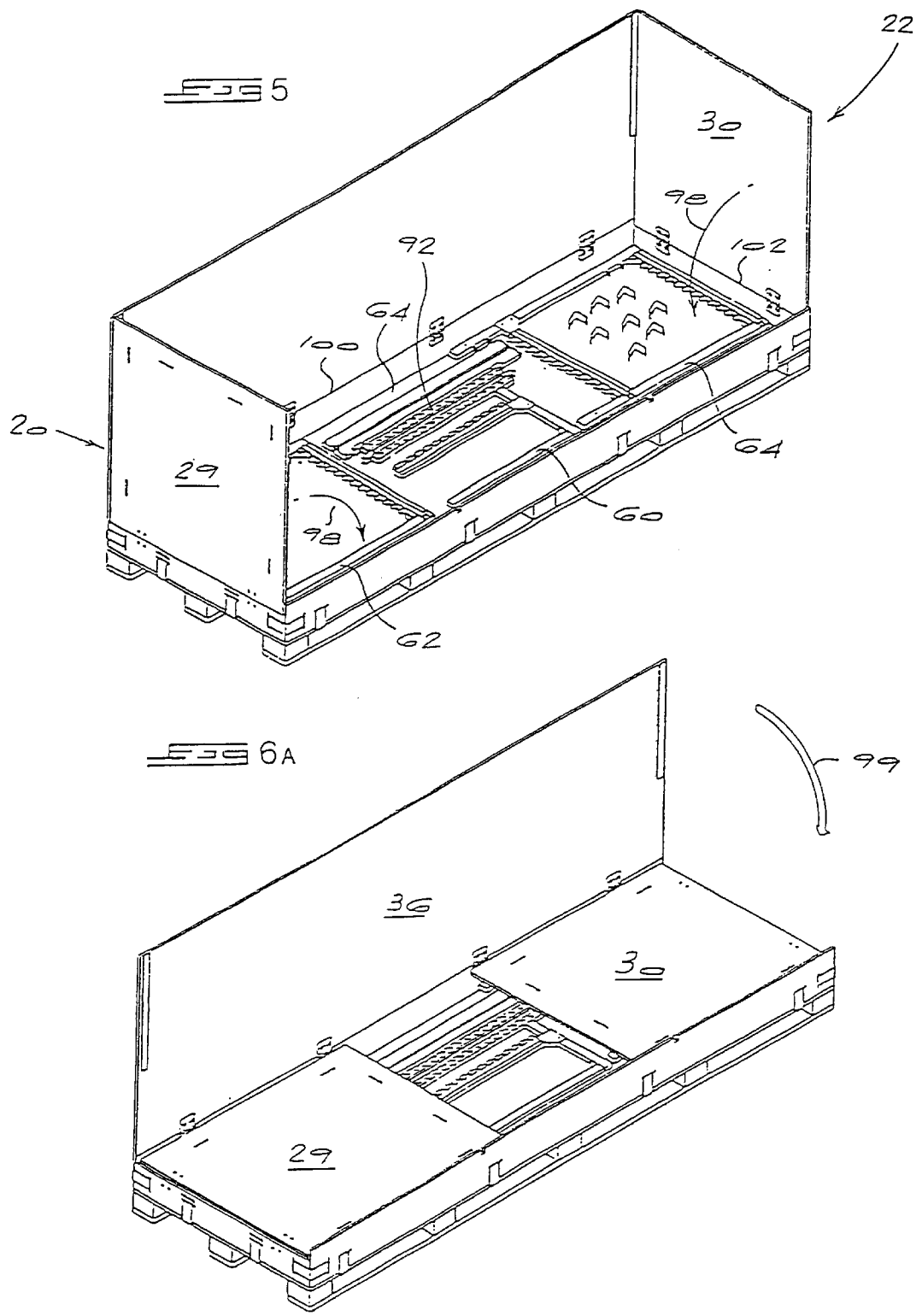

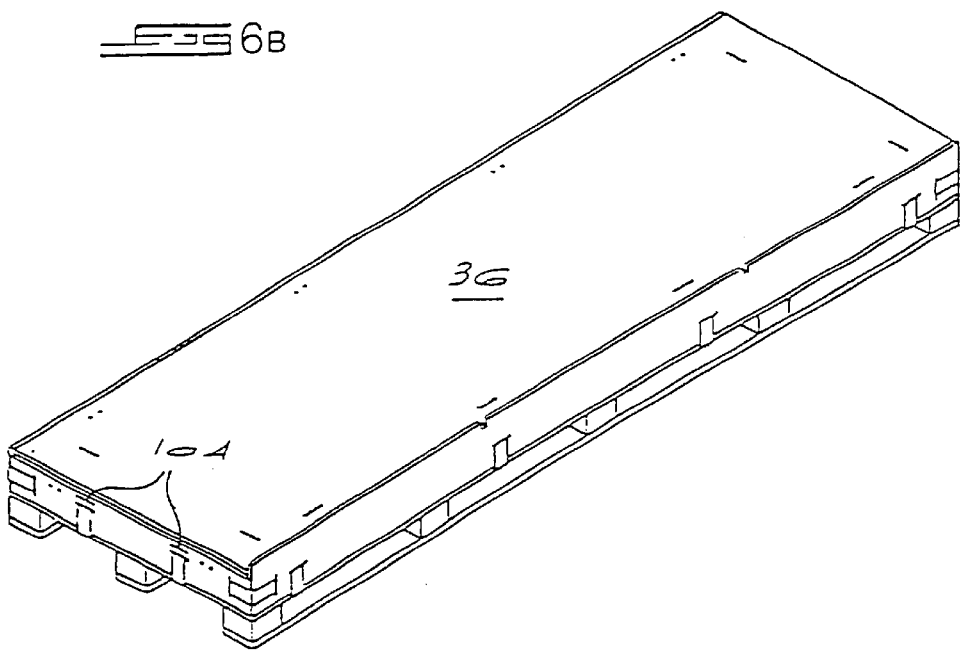
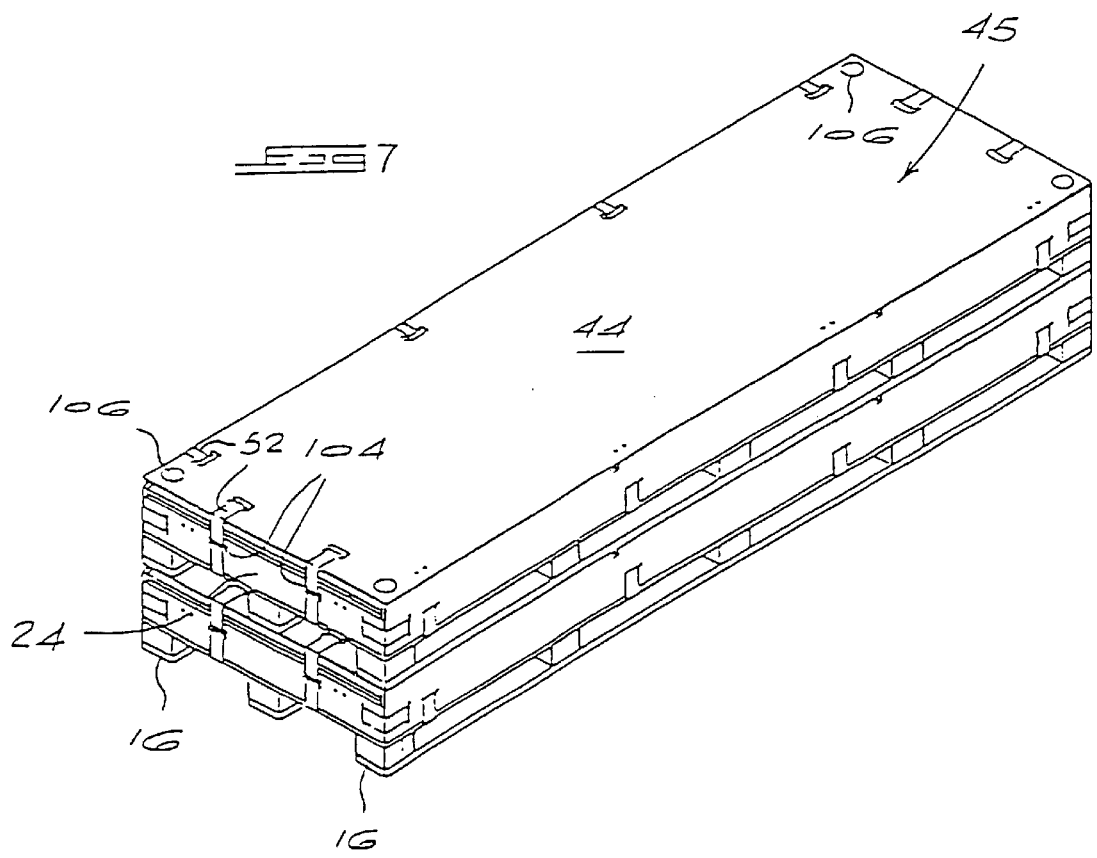

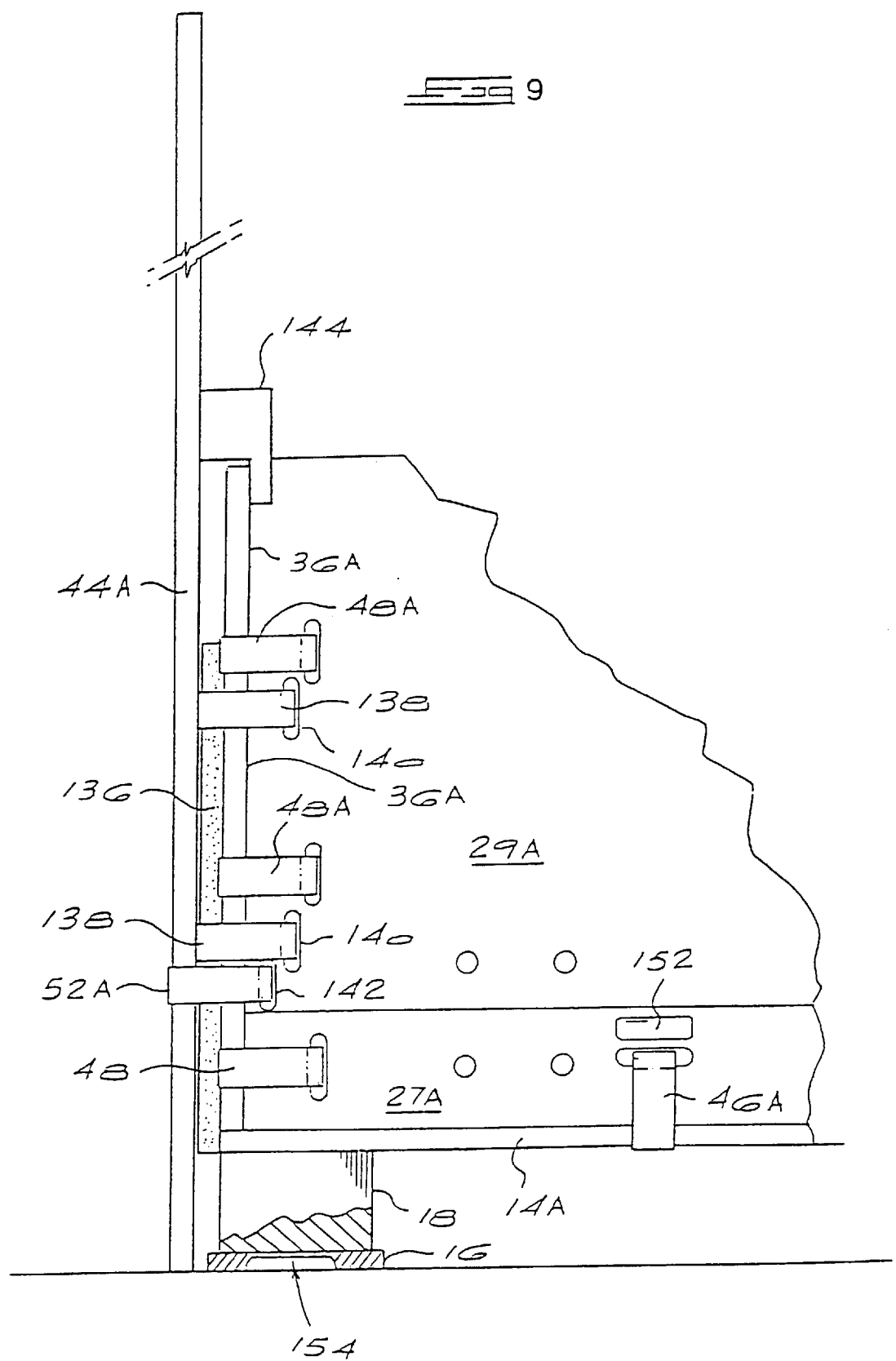

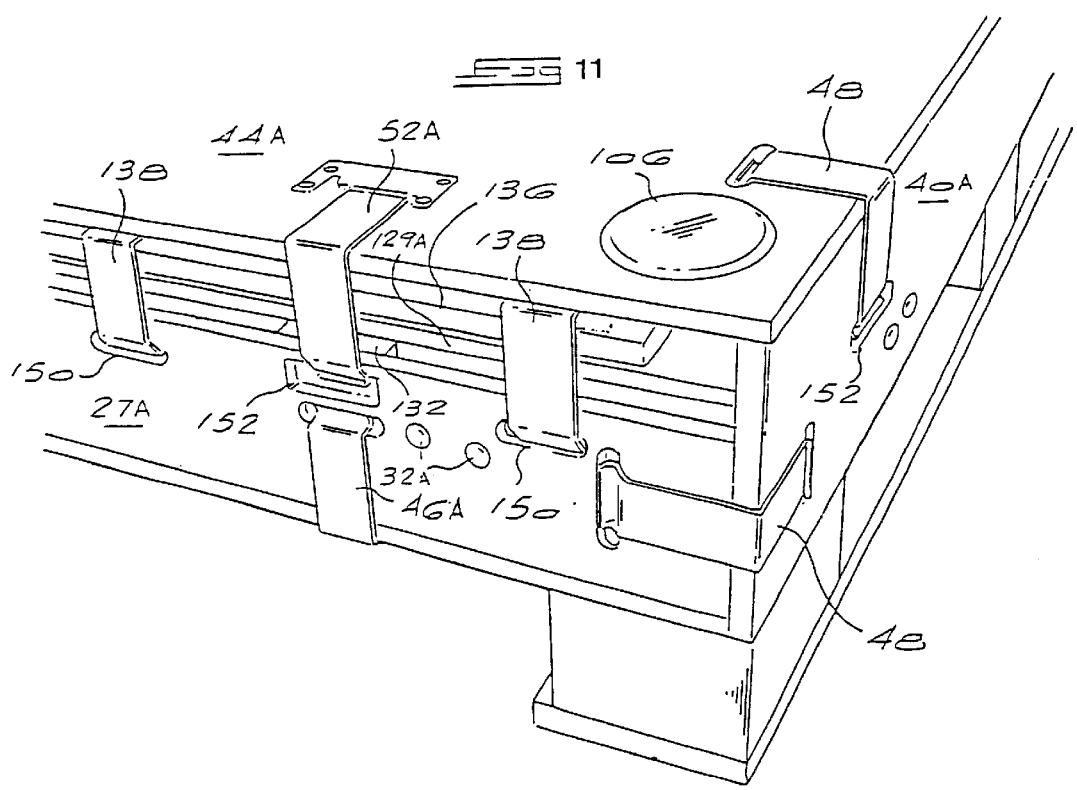

KNOCK DOWN STILLAGE BOX

BACKGROUND OF THE INVENTION

THIS invention relates to a reusable knock down stillage box.

Reusable knock down boxes have been used for some time in the transportation of goods such as motor vehicle parts. In order to protect and secure the parts within the erected box, stillage and dunnage or padding is customarily used. When the empty boxes are transported back to their destination, one of the boxes is kept erected so as to contain bath its stillage and dunnage together with the stillage and dunnage associated with, say, ten other boxes which are collapsed. This practice has given rise to several problems. The loading of the individual stillage and dunnage elements associated with a large number of boxes into a single erected box involves additional labour, and makes it difficult to keep track of the individual stillage and dunnage elements. The elements associated with separate boxes tend to get muddled, and as a result do not tend to fit as comfortably together as they would if kept in their separate sets.

SUMMARY OF THE INVENTION

According to the invention there is provided a knock down stillage box comprising a base panel, a plurality of side walls, a top panel and stillage components for retaining cargo within the box, each of the side walls comprising a lower side wall panel extending from the base panel and an upper side wall panel, the upper side wall panels being movable between an erected cargo stowing position in which the stillage components are erected for stowing cargo within the box and a collapsed stillage stowing position in which the top panel and the upper side wall panels, in combination with the base panel and the lower side wall panels, provide a sub-box defining a closed sub-volume within which the stillage components are stowable in a collapsed condition.

In a preferred form of the invention, the base panel is rectangular and the box includes four side walls, with three of the lower side wall panels being hinged to three of the upper side wall panels, and being foldable into the collapsed position in which they provide a top for the sub-box, and a fourth operatively front upper side wall panel being separable from a fourth operatively front lower side wall panel to define an access opening for loading and unloading the box.

Conveniently, the fourth upper side wall panel is detachably mountable to the adjacent side wall panels by means of L-shaped clips.

Typically, the fourth lower side wall panel is hinged to the base panel, and is movable between a lowered position in which it constitutes a loading ramp and an upper position in which it is clipped to the adjacent lower side wall panels by means of L-shaped clips to provide the sub-box.

Advantageously, the top panel is detachably dipped to at least some of the side walls by means of L-shaped clips having free ends which locate within corresponding mounting slots formed towards the upper side wall edges, with corresponding mounting slots being formed in the lower side wall panels for receiving free ends of the L-shaped dips when the box is in the collapsed stillage stowing position.

The L-shaped clips may include drop-away clips carried on the top panel, the drop-away clips being detachably mountable to corresponding mounting slots defined in those opposed upper side wall panels defining end walls to allow the top panel to be "piggybacked" onto the operatively rear upper side wall panel opposite the access opening when the rear upper side and end wall panels are in the erected position.

In one form of the invention, the top panel is hinged to the fourth upper side wall panel to form a side and top panel subassembly for the box when in an erected condition, the side and top panel sub-assembly being foldable into a collapsed condition and removable from the three erected upper side wall panels to facilitate on- and offloading of the cargo from the erected stillage components within the box.

In an alternative preferred form of the invention, the top panel is detachably mounted to the fourth upper side wall panel by means of the L-shaped clips engaging with corresponding mounting slots formed towards the upper edge of the fourth upper side wall panel.

Preferably, the fourth upper side wall panel is provided with L-shaped drop-away clips which are detachably mountable to corresponding mounting slots defined in the opposed upper end wall panels to allow the fourth front upper side wall panel to be "piggy-backed" onto the operatively rear upper side wall panel when the rear upper side and end wall panels are in the erected position, with the fourth upper side wall panel typically being arranged to be sandwiched between the rear erected upper side wall panel and the top panel.

Conveniently, corresponding mounting slots are formed in the lower side wall panels for receiving the free ends of L-shaped clips carried on the fourth upper side wall panel when the box is in the collapsed stillage stowing position.

Typically, the fourth upper side wall panel is arranged to be sandwiched between the folded down subjacent upper end wall panels and the superjacent lid panel when the box is in the collapsed stillage stowing position.

Preferably, at least some of the stillage components are detachably mountable to the base panel, the base panel being formed with stillage locating and mounting formations for mounting the stillage components in the erected condition.

At least some of the stillage components may also or alternatively be hingedly mounted to the base or side wall panels, the stillage components being movable between the erected article stowing condition and collapsed or disassembled condition which they are housed within the sub-box.

Typically, those stillage components or parts thereof which do not project beyond the internal height of the closed sub-volume are mounted permanently to the base panel.

Conveniently, at least some of the lower side wall panels are detachably clipped to the base panel by means of L-shaped clips.

Preferably, the base panel forms part of a base pallet assembly including a plurality of skid planks supporting the base panel on a plurality of pallet blocks, the skid planks including locating means and the top panel including complemental locating means for enabling both the erected boxes and the sub-boxes to be stacked on top of one another in an aligned configuration.

Advantageously the locating means comprise glide bosses fitted to the operatively outer surface of the top panel and complemental boss-locating recesses defined in the under surfaces of the skid planks.

Typically, the operatively front lower side wall panel and the opposed operatively rear lower side wall panel are fitted with support blocks for supporting the intervening upper side wall panels when in the folded down position, the front and rear lower side wall panels being at least a panel thickness higher than the intervening lower side wall panels for enabling the rear lower side panel to be folded down over the intervening upper side wall panels.

By the term "stillage components" is meant all reusable stillage and dunnage components used to support and cushion cargo within the box.

BRIEF DESCRIPTION OF THE DRAWINGS

FIG. 2 shows a top perspective view of the knock down box of FIG. 1 in the open erected condition;

FIG. 3 shows a top perspective view of the knock down box of FIG. 2 in an open erected condition just prior to unloading;

FIG. 4 shows an exploded disassembled perspective view of the base pallet and stillage;

FIG. 5 shows a top perspective view of the box in an open erected condition with the stillage in a stowed condition;

FIGS. 6A & 6B show top perspective views of the knock down box being folded into a knocked down position;

FIG. 7 shows a stack of knock down boxes in the fully knocked down position;

FIG. 9 shows a detailed side view of the box of FIG. 8 in the direction of arrow 9;

FIG. 10 shows a top perspective view of the box of FIG. 8 in the fully knocked down position; and FIG. 11 shows a detailed top perspective view of a corner of the knocked down box in the direction of arrow 11 In FIG. 10.

DESCRIPTION OF EMBODIMENTS

Figure 1:
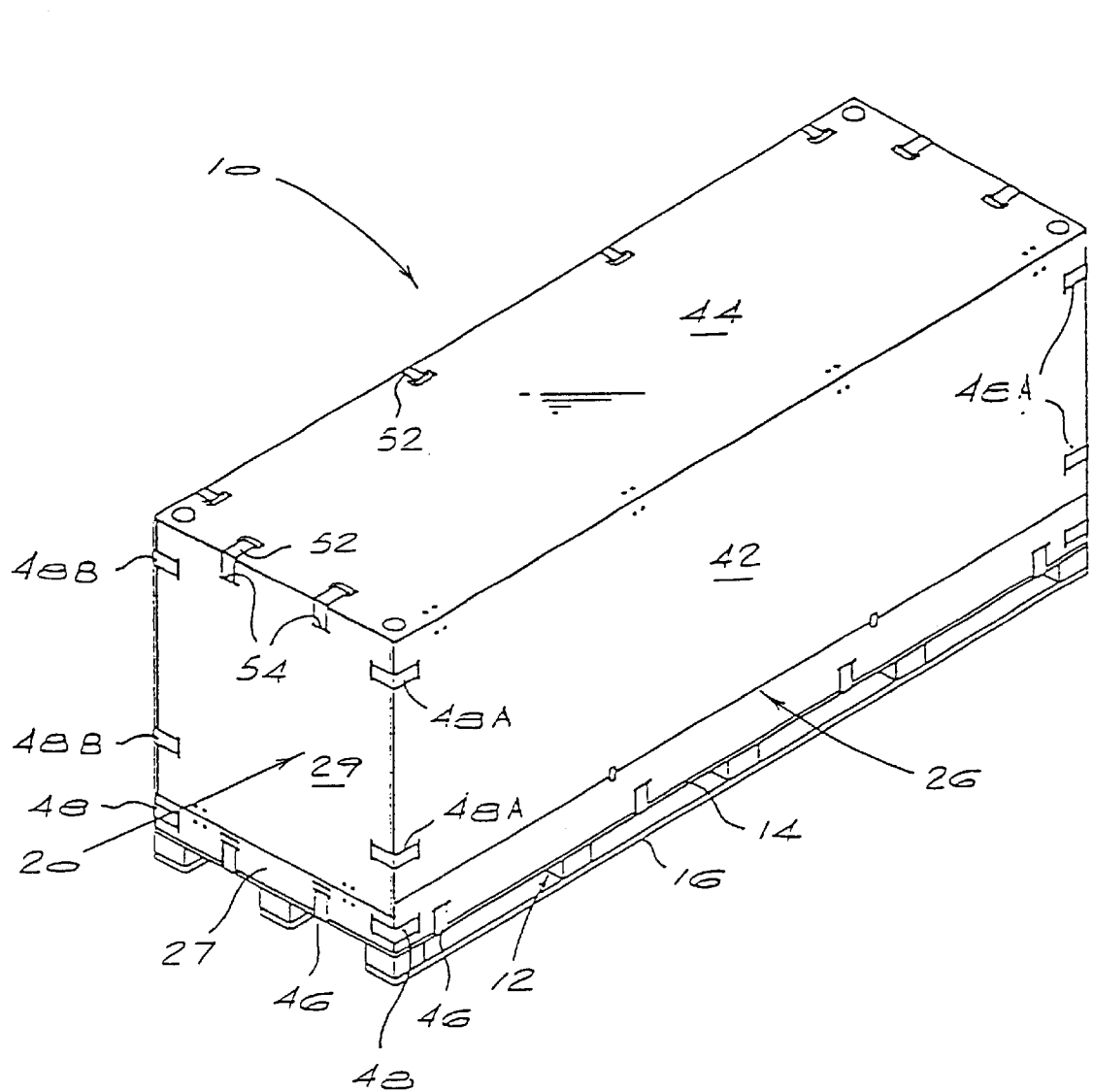
FIG. 1 shows a top perspective view of a first embodiment of a knock down box of the invention in a closed erected condition.
Figure 8:
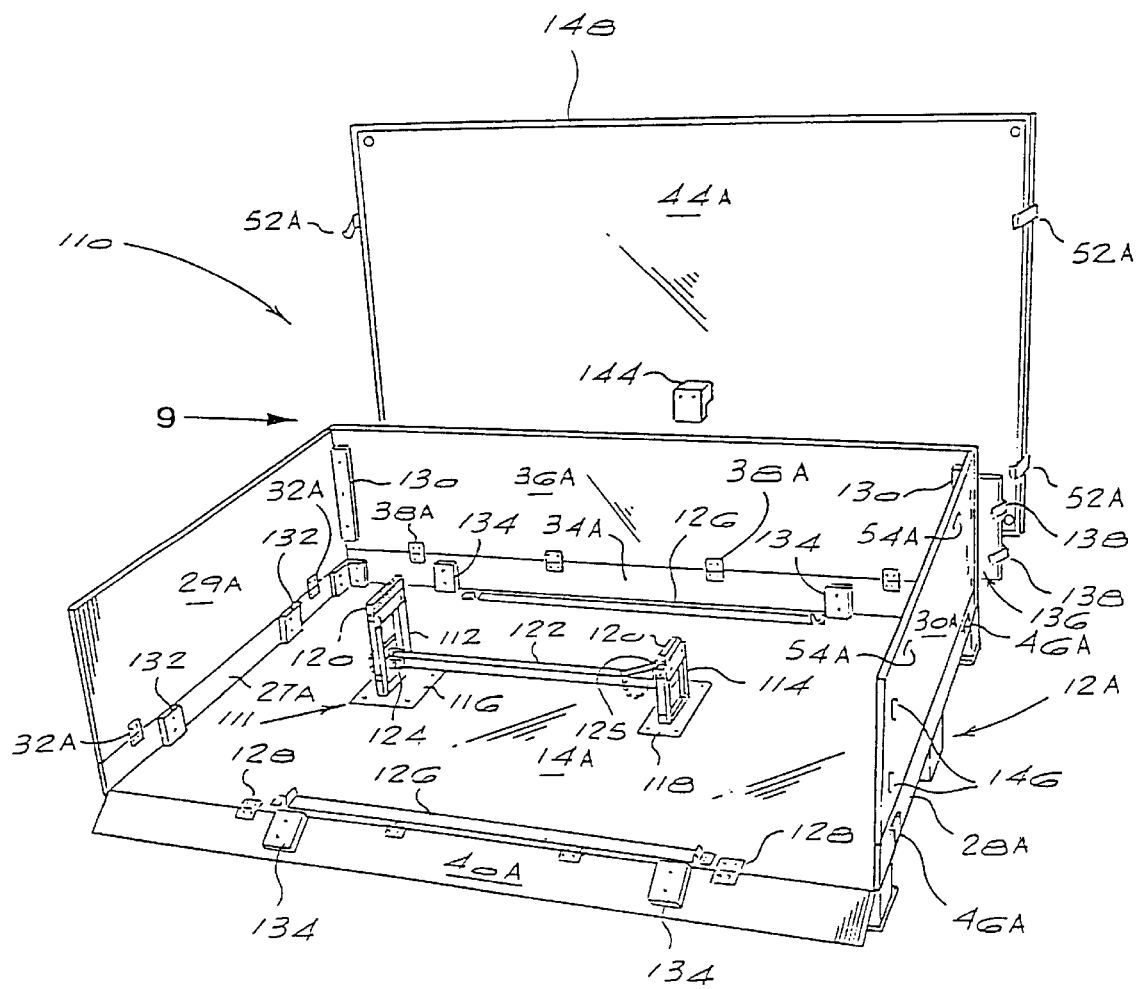
FIG. 8 shows a top perspective view of a second embodiment of a knock down stillage box of the invention in an open position ready for loading and unloading.

Referring first to FIGS. 1 and 2, a knock down stillage box 10 of the invention comprises a base pallet 12 having a rectangular base panel 14 supported on three parallel skid planks 16 via a series of pallet blocks or pedestals 18. Four side wall assemblies are in turn supported on the base pallet, and include minor opposed side wall assemblies 20 and 22 and major opposed side wall assemblies 24 and 26. Each of the minor end wall assemblies 20 and 22 comprise respective lower end wall panels 27 and 28 and upper end wall panels 29 and 30 which are hinged to the lower end wall panels 27 and 28 by means of pairs of hinges 32. The side wall assembly 24 similarly includes a lower side wall panel 34 joined to an upper side wall panel 36 by means of hinges 38. The hinges 32 and 38 terminate in inwardly projecting tangs and are similar to those disclosed in the applicant's co-pending South African patent application 99/0044. These hinges are located on the inside faces of the side and end wall panels, and are arranged to allow the upper end wall panels 29 and 30 and the upper side wall panel 36 to fold inwardly. The side wall assembly 26 includes a lower side wall panel 40 and a separate upper side wall panel 42 which is hinged on hinges 43 to a top panel 44 to form a separable top and side wall assembly 45.

All of the lower side and end wall panels are detachably connected to the base panel 14 by means of drop-away clips 46 carried on the base panel and described in more detail in the applicant's co-pending South African patent application 99/0044. Corner clips 48 hold the sides of the lower end and side wall panels together, and similar corner dips 48A and 48B hold the sides of the upper end and side wall panels together. Elongate inserts 51 are fitted to the upper side wall panel to provide outer rebates 51A to hold the upper end wall panels in an erected condition.

The top panel 44 is similarly fitted with drop-away clips 52, the free ends of which locate in complemental slots 54 located towards the upper edges of the upper end and side wall panels 28, 30 and 36.

In the closed erected condition illustrated in FIG. 1, the knock-down box is used to transport motor vehicle side panels of the type illustrated in dotted outline at 56 in FIG. 2. The panels are arranged side-by-side on stillage 58. As is clear from FIG. 4, the stillage 58 includes three vertical frame members 60, 62 and 64 connected together by means of cross bars 66 and 68. Each of the wooden frame members include respective base planks 70, 72 and 74 from which pegs 76 protrude which locate within complemental socket inserts 78 extending into the base panel 14. Each of the frame members are formed with vertical posts 80A, 80B and 80C from which respective horizontal rack members 82A, 82B and 82C extend. As is clear from the details at 84A, 84B and 84C respectively, each of the rack members are profiled differently to accommodate different sections of the vehicle side panels 56 in a snug complemental fit. The stillage is reversible, in that the pegs on the frame members can be switched around on the inserts 78 to enable left or right panels to be accommodated in the erect position for unloading.

Removable vertical posts 86 are fitted to the open ends of the frame members 62 and 64 by means of removable pins 88 which extend through registering apertures 89 and apertured brackets 89A. The cross members 66 and 68 are similarly provided with pins 88 and apertures 89 allowing them to be removed from their mounted location between registering eye-mounts 90. The frame members 62 and 64 are also provided with removable top cross members 92 which are similarly mounted in position using a pin and apertured bracket arrangement.

FIGS. 2 to 6B clearly illustrate the steps involved in converting the erected closed box of FIG. 1 to the collapsed closed sub-box of FIG. 7. The erected closed boxes of FIG. 1 are conveyed to appropriate locations in a vehicle assembly plant using fork lift conveyers. The skid planks may be fitted with castor wheels to assist in manipulating the loaded knock down boxes to their correct positions within the plant. As is dear from FIG. 2, the side and top wall assembly 45 is then removed by disengaging the drop-away clips 52 and the corner clips 48A which detachably join the upper side wall panel 42 to the upper end wall panels 29 and 30. As is clear from FIG. 3, the side and top wall panels 42 and 44 making up the side and top wall assembly 45 are then folded together, and after the corner clips 48B have been disengaged, the drop-away clips 52 are located within the vertical slots 94 previously occupied by the clips 48B. As a result, the side and top wall assembly 45 is effectively "piggybacked" onto the outer face of the upper side wall panel 36. The removed corner clips 48A and 48B are deposited on the base panel 15, and the removable vertical posts 86 and the top cross members 92 are disconnected from the stillage and similarly stowed on the floor of the base panel 14. In order to assist in unloading and loading the box, the lower side panel 40 may be detached from the base panel and moved to the position indicated in broken outline at 96 in which it serves as a ramp. In this case, the base clips 46 holding the lower side wall panel 40 to the base panel may be replaced with hinges.

Referring now to FIG. 5, after unloading has been completed, the various frame components making up the stillage are demounted from the apertured inserts 78 and laid flat on the floor of the base panel 14 in the manner illustrated in FIG. 5. Thereafter, the top end wall panels 29 and 30 are folded inwardly in the direction of arrows 98 to the FIG. 6A position, and the upper side wall panel 36 is folded down on top of the upper end wall panels 29 and 30 in the direction of arrows 99 to the FIG. 6B position. In order to allow for sufficient folding clearance, the fold line 100 on the side wall assembly 24 is over a panel thickness higher than the fold lines 102 on the side wall assemblies 20 and 22. The side and top wall assembly 45, which was detached from the side wall 24 prior to the upper side and end wall panels being collapsed, is then placed on top of the collapsed upper side wall panel 36, with the free ends of the drop-away clips 52 locating within tipper horizontal slots 104 provided in the lower end wall panels 27 and 28 so as to create a unitary clamped sub-box defining a volume within which the various disassembled loose stillage and clip components are stowed.

In order to facilitate stacking, nylon glide bosses 106 are fitted to the outer surface of the top panel 44. These glide bosses 106 are designed to locate in complemental recesses (not shown) located within the outer comers of the skid planks 16.

Erection of the box and the stillage, loading of the stillage and subsequent closure of the erected box takes place in exactly the reverse manner as the knock down procedure, following the various steps from FIGS. 7 to 1.

FIGS. 8 to 11 illustrate a second improved embodiment of a knock down stillage box 110 of the invention. Similar components will be identified by the same numerals suffixed by an "A", and will essentially be described with reference to the differences that exist between the two embodiments. The stillage components include a pair of upright steel mounting brackets 112 and 114 which are hinged to respective steel mounting plates 116 and 118. The mounting plates are in turn screwed firmly onto the base panel 15A The mounting brackets 112 and 114 are capped with rubber dunnage pads 120, and a cross bar 122 is pivotably mounted at 124 to the bracket 112. The opposite end of the cross bar 122 is connected to the mounting bracket 114 by means of a retaining pin 125. Suitably shaped stillage strips 126 are screwed to the base panel 14A on opposite sides of the main stillage assembly. The particular stillage and dunnage described is used to support a series of motor vehicle floor panels.

A lower side wall panel 34A and lower end wall panels 27A and 28A are all clipped to the base panel 14A by means of clips 46A in the manner previously described. The clips 46A may be drop-away clips or alternatively may be separable from the base panel. The front lower side wall panel 40A is hinged to the base panel 14A by means of hinges 128 so as to provide a drop-away loading flap. The upper side wall panel 36A and the adjacent upper end wall panels 29A and 30A are similarly hinged to their respective lower side and end wall panels. Retaining strips 130 screwed to opposite ends of the upper side wall panel 36A serve to hold the upper end wall panels 29A and 30A in the open position. Support blocks 132 are screwed onto the opposed lower end wall panels, and extend the width of the lower end wall panels so as to support the upper end wall panels 29A and 30A when in the folded down condition. Support blocks 134 are similarly screwed onto the lower side wall panels 34A and 40A to support the upper end wall panels 29A and 30A when folded down. The lower side wall panel 34A is higher than the lower side wall panels 27A and 28A by the panel thickness of the upper side wall panel 36A in conjunction with the thickness of the side strips 130 so that the upper side wall panel 36A can be folded down horizontally over the upper end wall panels 29A and 30A without placing undue strain on the panel hinges 38A.

The upper front side wall panel 136 is separate from the top or lid panel 44A and the minor side edges are fitted with pairs of drop-away clips 138. When in the open loading and unloading position of FIG. 8, both the upper front wall panel 136 and the top wall panel 44A are piggy-backed onto the upper rear side wall panel 36A in the manner illustrated in detail in FIG. 9. The tanged ends of the drop-away clips 138 of the upper front wall panel 136 locate within corresponding vertical slots 140 formed towards the front edges of the upper end wall panels 29A and 30A. The lid panel 44A, which is similarly fitted with drop-away clips 52A, is mounted over the upper front wall panel 136, with opposed lower drop-away clips 52A locating in corresponding vertical slots 142 formed in the respective upper end wall panels 29A and 30A. Additional support for the top panel 44A is provided by a hook block 144 screwed onto the inner surface of the lid panel, extending over the upper edge of the side wall panel 36A in a manner illustrated in detail at FIG. 9 to assist in securing the lid panel in position. Detachable corner clips 48A connect the upper side wall panels 36A to the end wall panels 29A and 30A, and similar Corner clips 48 hold the lower end and side wall panels in an upright condition.

In the closed erected condition, the upper front side wall panel 136 rests on the lower front side wall panel 40A, with the drop-away clips 138 locating within corresponding slots 146 located towards the front edges of the upper end wall panels 29A and 30A. The lid panel 44A, which is formed with an outer peripheral rebate 148 to assist in locating the lid panel over the upper edges of the side and end wall panels, is then located in position. The drop-away clips 52A extend around the opposite end and rear side edges of the lid panel 44A, and locate in corresponding horizontal slots 54A formed in the upper end and side wall panels with the front side edge of the lid panel 44A being fitted to the upper front wall panel 136 by means of removable clips.

After the box has been unloaded, it is knocked down by first unpinning the cross bar 122 so as to allow the support brackets 112 and 114 to be folded down into a collapsed position in which all of the stillage components are lower than the minimum height of the lower side and end walls. The lower front side wall panel 40A is folded to an upright position and clipped to the adjacent lower end wall panels, after which the upper end wall panels 29A and 30A are folded down, followed by the upper side wall panel 36A after the lid panel 44A and front upper side wall panel 136 have been unclipped.

As is clear from the detail of FIG. 11, the front upper side wall 136 is then clipped into a stacked position adjacent the rear upper side wall panel 36A, with the drop-away clips 138 locating within corresponding slots 150 defined in the lower end wall panels 27A and 28A. Thereafter, the lid panel 44A is clipped into position, with the drop-away clips 52A and the removable clips 48 locating within corresponding slots 152 formed in the lower end and side wall panels. Stacking of the knocked down boxes 110 is identical to those of the first embodiment, with the glide bosses 108 nesting in corresponding recesses 154 (see FIG. 9) formed in the undersurfaces of the skid planks 16.

It will be appreciated that the stillage and dunnage components may take any form, depending on the articles being stowed within the box. As is the case with the stillage strips 126, any stillage or dunnage which is lower than the closed sub-volume when erected may be fixed permanently to the base panel. In the embodiments described above, the stowed articles are in the form of motor vehicle panels, and the stillage and dunnage, as well as the overall box dimensions, are adapted to receive different panel types, such as door panels, bonnet panels, boot panels, floor panels and the like. In certain configurations, the fourth upper side wall panel is in the form of a minor removable end wall panel which is removed in conjunction with the top panel for loading and unloading purposes.

Where possible, drop-away clips are employed to retain the panels in the erected, stacked and semi-open conditions. Where drop-away clips would tend to interfere, in particular with the knocked down configuration, these are replaced with detachable dips which are stowed in the sub-volume together with the stillage and dunnage when the knocked down boxes are shipped back to their cargo loading destination.

I claim:

1. A knock down stillage box comprising a base panel, four side walls, a top panel and stillage components for retaining cargo within the box, each of the side walls comprising a lower side wall panel extending from the base panel and an upper side wall panel, the upper side wall panels being movable between an erected, cargo stowing position in which the stillage components are erected for stowing cargo within the box, and a collapsed, stillage stowing position in which the top panel and the upper side wall panels, in combination with the base panel and the lower side wall panels, provide a sub-box defining an internal sub-volume within which the stillage components are stowable in a collapsed condition, wherein three of the upper side wall panels are hinged to three of the lower side wall panels and are foldable into the collapsed position in which they form part of the sub-box, wherein a fourth front upper side wall panel is separable from a fourth front lower side wall panel to define an access opening for loading and unloading the box, and wherein the fourth front lower side wall panel is movable between an upper position in which it is clipped to adjacent lower side wall panels, and a lower, loading position in which it is lowered relative to the base panel to increase the size of the access opening for loading and unloading the box.

2. A knock down stillage box according to claim 1 in which the fourth front upper side wall panel is detachably mountable to the adjacent upper side wall panels by means of L-shaped clips.

3. A knock down stillage box according to claim 1 in which the top panel is detachably clipped to at least some of the upper side wall panels by means of L-shaped clips having free ends which locate within corresponding mounting slots formed in the upper side wall panels, with corresponding mounting slots being formed in the lower side wall panels for receiving free ends of the L-shaped clips when the box is in the collapsed, stillage stowing position.

4. A knock down stillage box according to claim 3 in which the L-shaped clips include drop-away clips carried on the top panel, the drop-away clips being detachably mountable to corresponding mounting slots defined in those opposed upper side wall panels defining end walls to allow the top panel to be "piggybacked" onto the operatively rear upper side wall panel opposite the access opening when the rear upper side and end wall panels are in the erected position.

5. A knock down stillage box according to claim 3 in which the top panel is detachably mounted to the fourth front upper side wall panel by means of the L-shaped clips engaging with corresponding mounting slots formed towards the upper edge of the fourth front upper side wall panel.

6. A knock down stillage box according to claim 3 in which the fourth upper front side wall panel is provided with L-shaped drop-away clips which are detachably mountable to corresponding mounting slots defined in the opposed upper end wall panels to allow the fourth front upper side wall panel to be "piggy-backed" onto the operatively rear upper side wall panel when the rear upper side and end wall panels are in the erected position.

7. A knock down stillage box according to claim 4 in which the fourth front upper side wall panel is arranged to be sandwiched between the rear erected upper side wall panel and the top panel.

8. A knock down stillage box according to claim 3 in which corresponding mounting slots are formed in the lower side wall panels for receiving the free ends of L-shaped clips carried on the fourth front upper side wall panel when the box is in the collapsed, stillage stowing position.

9. A knock down stillage box according to claim 8 in which the fourth front upper side wall panel is arranged to be sandwiched between the folded down subjacent upper end wall panels and the superjacent top panel when the box is in the collapsed, stillage stowing position.

10. A knock down stillage box according to claim 1 in which at least some of the stillage components are hingedly mounted to the base panel or side wall panels, the stillage components being movable between an erected article stowing condition and a collapsed or disassembled condition in which they are housed within the sub-box.

11. A knock down stillage box according to claim 1 in which the stillage components or parts thereof which do not project beyond the height of the internal sub-volume are mounted permanently to the base panel.

12. A knock down stillage box according to claim 1 in which at least some of the lower side wall panels are detachably dipped to the base panel by means of L-shaped clips.

13. A knock down stillage box according to claim 1 in which the base panel forms part of a base pallet assembly including a plurality of skid planks supporting the base panel on a plurality of pallet blocks, the skid planks including locating means, and the top panel including complemental locating means for enabling both the erected boxes and the sub-boxes to be stacked on top of one another in an aligned configuration.

14. A knock down stillage box according to claim 13 in which the locating means comprise glide bosses fitted to the operatively outer surface of the top panel and complemental boss-locating recesses defined in the under surfaces of the skid planks.

15. A knock down stillage box according to claim 1 in which the front lower side wall panel and the opposed rear lower side wall panel are fitted with support blocks for supporting the intervening upper side wall panels when in the folded down position, the front and rear lower side wall panels being at least a panel thickness higher than the intervening lower side wall panels for enabling the rear upper side wall panel to be folded down over the intervening upper side wall panels.

\* \* \* \* \*

UNITED STATES PATENT AND TRADEMARK OFFICE
CERTIFICATE OF CORRECTION

PATENT NO. : 6,598,756 B1
DATED : July 29, 2003
INVENTOR(S) : Rosenfeldt

It is certified that error appears in the above-identified patent and that said Letters Patent is hereby corrected as shown below:

<u>Title page,</u>
Item [57], ABSTRACT,
Line 4, "wail" should read -- wall --;
Line 9, "In" should read -- in --.

<u>Column 8,</u>
Line 42, "dipped" should read -- clipped --.

Signed and Sealed this

Seventh Day of October, 2003

JAMES E. ROGAN
*Director of the United States Patent and Trademark Office*